Jan. 7, 1930.  W. T. JETTON  1,743,036
ANIMAL TRAP
Filed Jan. 20, 1928
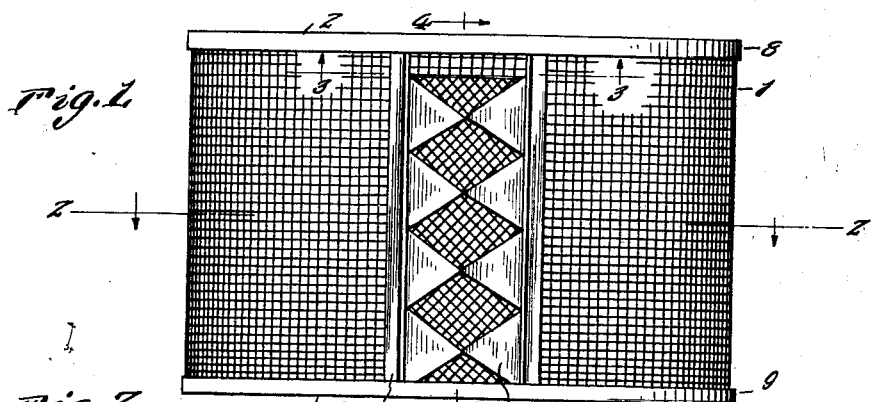
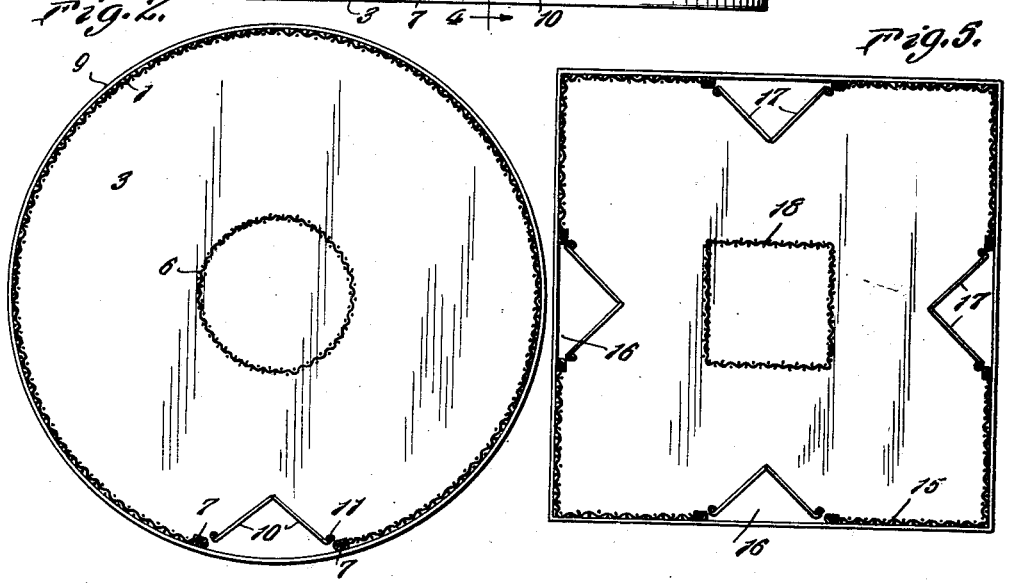
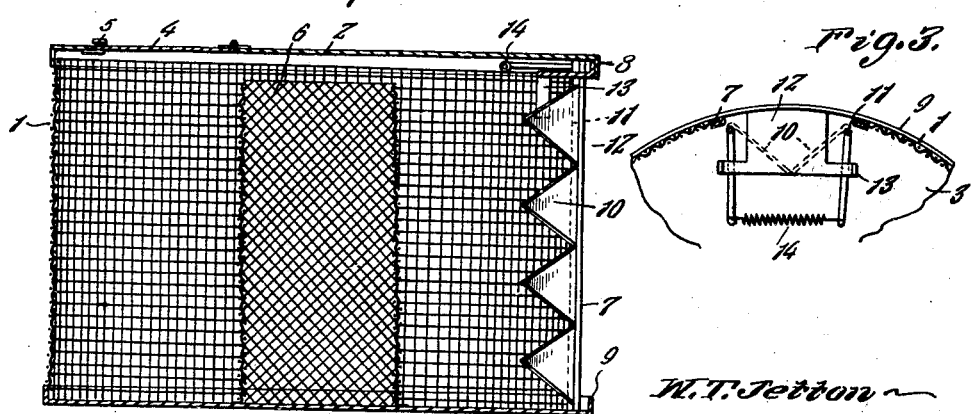
W. T. Jetton
INVENTOR
BY Victor J. Evans
ATTORNEY Patented Jan. 7, 1930

1,743,036

UNITED STATES PATENT OFFICE

WALTER T. JETTON, OF DE LEON, TEXAS

ANIMAL TRAP

Application filed January 20, 1928. Serial No. 248,226.

This invention relates to traps, and its general object is to provide an animal trap of the housing and self-setting type, that lures animals within its housing due to the novel arrangement of the bait carrying means and the manner of gaining access to the housing but prevents the animals from escaping under all conditions.

A further object of the invention is to provide an animal trap of the character set forth, that is simple in construction, inexpensive to manufacture and efficient in operation and service.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:

Figure 1 is a front elevation of the trap forming the subject matter of the present invention.

Figure 2 is a sectional view taken approximately on line 2—2 of Figure 1, looking in the direction of the arrows.

Figure 3 is a fragmentary top plan view illustrating the mechanism for controlling the self-closing doors of my trap.

Figure 4 is a sectional view taken approximately on line 4—4 of Figure 1, looking in the direction of the arrows.

Figure 5 is a view similar to Figure 2 of a modified form of the invention.

Referring to the drawings in detail, it will be noted that the housing is cylindrical shape in formation and includes an upright wall 1 formed from wire mesh, a top wall 2 and a bottom wall 3, both of which are formed from sheet metal or the like. The top wall is provided with a door 4 whereby access may be had to the trap and the door is hingedly secured at one end and provided with a suitable latch 5 at its opposite end as shown in Figure 4.

Secured to and rising centrally from the bottom wall 3 is a bait holder 6 which is formed in cylindrical formation and from wire mesh. The bait holder 6 terminates at its upper end in spaced relation with respect to the top wall 2 so that bait can be easily put therein and also for the purpose of luring animals within the housing, as it will appear that they will be able to get the bait with very little effort.

The upright wall is provided with a door opening having its side edges reinforced by metallic strips 7 which have their ends secured to confronting flanges 8 and 9 formed with the outer edge of the top and bottom walls respectively, as shown in Figure 4. The metallic strips are substantially U-shaped in cross section, and have secured therein the ends of the upright wall.

The opening formed in the upright wall is controlled by a pair of doors 10 which are secured to pivot pins 11 having their ends mounted in bearing openings formed in the bottom wall 3 and a plate 12 arranged in parallelism with the top wall 2. The plate 12 has one end portion secured to the flange 8 and depending from the opposite end portion and upon opposite sides thereof are tongues 13 which provide stops for the doors to limit their movement in an open direction as will be apparent upon inspection of Figure 3 of the drawings.

In order to retain the doors in closed position, the pivot pins 11 have their upper ends bent to be disposed at right angles to the body portions thereof and fixed to the ends of these bent portions is a coil spring 14. The doors have their free portions cut away to provide substantially triangular shaped members which provide relatively large teeth normally arranged whereby the apex of the triangle shaped members are disposed in contacting engagement as best shown in Figure 1 of the drawing. The doors are held in this last mentioned position, through the medium of the coil spring 14 and will be obvious that an animal can pass through the door opening and between the doors to enter the housing, but due to the stops 13, an animal confined within the housing cannot escape during the passage of an animal going therein.

In Figure 5 I have shown a modified form of my invention, and in this form the housing which is indicated by the reference numeral 15, is provided with square corners, with a door opening 16 and doors 17 therefor in each side of the housing. The bait chamber 18 is likewise provided with square corners, to conform to the shape of the housing. The structure of this modified form may be otherwise similar to the other form as shown in Figures 1 to 4.

While I have shown the form in Figure 5 as being substantially square, I want it understood that it can be rectangular in formation or other desired shape as well as size, without departing from the spirit of the invention.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:

A trap of the character described comprising a cylindrical housing including a wire mesh upright wall, a flanged top and bottom wall secured to the upright wall, a wire mesh cylindrical bait holder secured to the bottom wall and rising therefrom, said bait holder being disposed in spaced relation with respect to the top wall, a door for closing an opening in the top wall, cooperating toothed doors for closing a door opening in the upright wall, pivot pins for said toothed doors, right angularly bent upper ends formed on said pins, spring means for normally retaining the toothed doors in closed position and secured to the right angularly bent ends, a plate arranged in parallelism with the top wall, and tongues formed on said plate and depending therefrom to provide stops arranged in the path of the toothed doors to limit their movement in open position.

In testimony whereof I affix my signature.

WALTER T. JETTON.